US011933009B2

(12) United States Patent
Barthlott et al.

(10) Patent No.: US 11,933,009 B2
(45) Date of Patent: Mar. 19, 2024

(54) APPARATUS AND METHOD FOR PICKING UP OIL FROM THE SURFACE OF WATER

(71) Applicant: RHEINISCHE FRIEDRICH-WILHELMS-UNIVERSITÄT BONN, Bonn (DE)

(72) Inventors: Wilhelm Barthlott, Bonn (DE); Markus Moosmann, Bonn (DE); Matthias Mail, Waghäusel (DE)

(73) Assignee: RHEINISCHE FRIEDRICH-WILHELMS-UNIVERSITÄT BONN (DE)

( * ) Notice: Subject to any disclaimer, the term of this patent is extended or adjusted under 35 U.S.C. 154(b) by 0 days.

(21) Appl. No.: 17/262,972

(22) PCT Filed: Jul. 25, 2019

(86) PCT No.: PCT/EP2019/070089
§ 371 (c)(1),
(2) Date: Feb. 10, 2021

(87) PCT Pub. No.: WO2020/021031
PCT Pub. Date: Jan. 30, 2020

(65) Prior Publication Data
US 2021/0238818 A1  Aug. 5, 2021

(30) Foreign Application Priority Data
Jul. 26, 2018 (DE) .......................... 102018118139.6

(51) Int. Cl.
E02B 15/10 (2006.01)
E02B 15/04 (2006.01)

(52) U.S. Cl.
CPC .......... E02B 15/101 (2013.01); E02B 15/046 (2013.01)

(58) Field of Classification Search
CPC ...... E02B 15/101; E02B 15/046; E02B 15/10; E02B 15/106; E02B 15/04; Y02A 20/204;
(Continued)

(56) References Cited

U.S. PATENT DOCUMENTS 2,746,895 A * 5/1956 Duvall ................... D21H 25/00
425/81.1
3,667,608 A 6/1972 Burroughs et al.
(Continued)

FOREIGN PATENT DOCUMENTS

CN 102228884 A * 11/2011 ............... B05D 5/08
DE 2 343 989 3/1974
(Continued)

OTHER PUBLICATIONS

Oleophilic_definition_NPL.pdf (Year: 2022).*
(Continued)

Primary Examiner — Ekandra S. Miller-Cruz
(74) Attorney, Agent, or Firm — Davidson, Davidson & Kappel, LLC

(57) ABSTRACT

The invention relates to a device for taking up oil from a water surface, comprising a container for receiving the oil and an oil-transporting means, wherein a portion of the oil-transporting means can be brought into fluid communication with the water surface and another portion of the oil-transporting means is disposed within the container, wherein the oil can be transported into the container via the oil-transporting means, wherein the oil-transporting means is formed from a hydrophobic fabric, the surface of which comprises filament-shaped and/or grid-like structures which are designed in such a way that they retain a gas layer on the surface of the hydrophobic fabric under water. The invention further relates to a corresponding method for taking up oil from a water surface.

11 Claims, 3 Drawing Sheets

(58) Field of Classification Search
CPC .. B01D 17/02; B01D 17/0208; B01D 17/045; B01D 17/085; C02F 1/40; C02F 2103/007; C02F 2201/08
USPC ...... 210/747.6, 23, 170, 172, 242, 279, 289, 210/457, 460, 496, 510
See application file for complete search history.

(56) References Cited

U.S. PATENT DOCUMENTS

| | | | | |
|---|---|---|---|---|
| 4,006,079 | A | * | 2/1977 | Langlois ................ C02F 1/681 |
| | | | | 210/680 |
| 4,126,556 | A | * | 11/1978 | Swanson ............ B01D 17/0214 |
| | | | | 210/924 |
| 4,371,441 | A | * | 2/1983 | Mathes ................ H04B 15/02 |
| | | | | 162/146 |
| 5,154,835 | A | * | 10/1992 | DeMichael ........ B01D 17/0214 |
| | | | | 210/744 |
| 5,227,072 | A | | 7/1993 | Brinkley |
| 2015/0027939 | A1 | * | 1/2015 | Quinones ............... B65G 17/44 |
| | | | | 210/170.01 |
| 2015/0273791 | A1 | * | 10/2015 | Schimmel ............... B63B 59/04 |
| | | | | 156/60 |
| 2016/0176732 | A1 | * | 6/2016 | Holtz ..................... C02F 3/043 |
| | | | | 210/602 |

FOREIGN PATENT DOCUMENTS

| | | |
|---|---|---|
| GB | 1 396 397 | 6/1975 |
| GB | 1 442 219 | 7/1976 |
| IT | 1076388 B * 4/1985 ............. E02B 15/10 |
| KR | 200142853 Y1 * 6/1999 ........... E02B 15/046 |
| WO | WO 00/00701 A1 1/2000 |
| WO | WO 00/00702 A1 1/2000 |
| WO | WO-2017117432 A1 * 7/2017 ............. B32B 5/028 |

OTHER PUBLICATIONS

Zeiger, Claudia "Microstructures of superhydrophobic plant leaves—inspiration for efficient oil spill cleanup materials" Bioinsporation & Biomimetics, Bd. 11, 2016, H. 5, Artikelnummer: 056003.—ISSN Insitute of Physics Publishing (IOP). DOI: 10.1088/1748-3190/11/5/056003. URL: iopscience.iop.org/article/10.1088/1748-3190/11/5/056003/pdf[abgerufen am Jan. 24, 2019].

International Search Report dated Sep. 10, 2019 from corresponding International Application No. PCT/EP2019/070089.

English Translation of International Search Report dated Sep. 10, 2019 from corresponding International Application No. PCT/EP2019/070089.

International Written Opinion dated Sep. 10, 2019 from corresponding International Application No. PCT/EP2019/070089.

German Search Report dated Mar. 25, 2019 from corresponding German Application No. DE 10 2018 118 139.6.

Chinese Office Action dated Feb. 25, 2022 from corresponding Chinese Application No. CN 2019800631090.

* cited by examiner

A

B

APPARATUS AND METHOD FOR PICKING UP OIL FROM THE SURFACE OF WATER

This application is a U.S. national phase application under 35 U.S.C. of § 371 of International Application No. PCT/EP2019/070089, filed on Jul. 25, 2019, which claims priority to European Patent Application No. DE 10 2018 118 139.6, filed Jul. 26, 2018, the disclosures of which are hereby incorporated by reference herein.

The invention relates to the field of oil removal from water surfaces, and more particularly to a device and a method for removing oil from water surfaces.

The energy generation which is largely based on the combustion of oil and fuel and the associated transport of crude or mineral oil often bring along a pollution of the environment by oil. Waterbodies are particularly affected, for example by tanker accidents or damaged pipelines. This oil should be removed as quickly as possible. Various methods are already available for taking up oil films on the water surface. Oil binders, mostly powdery substances, absorb or bind the oil and then either remain on the water surface, from where they have to be removed again, or sink to the bottom of the waterbody. In the event of major accidents, moreover, oil suction barriers are used to enclose and suck off the oil on the water. However, these cannot be used near the shore and a prophylactic use is also not advisable. Moreover, oil binding mats, which absorb the oil, or so-called skimmers are used for acute oil contamination, wherein the oil is actively sucked off the surface.

WO 00/00702 A1 describes an oil removal and oil transport device and a method using the same for removing and transporting oil. Here, the oil is absorbed into a bulk material, wherein the bulk material comprises an inlet area and an outlet area, and the oil is guided into the inlet area of the bulk material via a membrane. The oil is removed from the outlet area of the bulk material. The membrane has an average pore size of no more than 100 micrometers, so that the oil is continuously transported through the membrane into the inlet area of the bulk material and is continuously discharged from the outlet area of the bulk material into a reservoir. Here, for example, a pressure difference can be built up across the membrane by means of a vacuum or the oil can be conveyed into the container by use of a pump. WO 00/00701 A1 describes a component for liquid transport which comprises at least one bulk area and a wall area which completely surrounds the bulk area and which includes a membrane opening area and an open port area.

C. Zeiger el al. disclose in Bioinspiration & Biomimetics 2016, 11, 056003, microstructures on superhydrophobic plant leaves such as those of the floating ferns of the genus *Salvinia* as inspiration for oil-absorbing materials. These floating ferns have on their surface hydrophobic, water-repellent or non-wettable hairs with hydrophilic, i.e. water-attracting, sites on the tips that bind water to the hair structures and can retain an air film on their surface under water. This phenomenon is known as the *Salvinia* effect. The floating ferns can absorb oil from water on their leaf surface. However, no use of this effect is described.

It is an object of the present invention to provide a device which can be used to take up oil from a water surface.

The object is achieved by a device for taking up oil from a water surface, comprising a container for receiving the oil and an oil-transporting means, wherein a portion of the oil-transporting means can be brought into fluid communication with the water surface and a further portion of the oil-transporting means is disposed in the container, wherein the oil can be transported into the container via the oil-transporting means. Here, the oil-transporting means is formed of a hydrophobic, preferably superhydrophobic, fabric, the surface of which comprises filament-shaped and/or grid-like structures which are formed such that they retain a gas layer on the surface of the hydrophobic, preferably superhydrophobic, fabric under water.

According to the invention, a device for taking up oil from a water surface based on gas or air-retaining surfaces is provided. A gas or air-retaining surface is understood to mean surfaces which are capable of retaining a gas layer, preferably air, but also other gases or gas mixtures, in the submerged state permanently or at least for the duration of the application. Air-retaining surfaces can in particular be used to remove oil. The gas is therefore preferably air. Thus, in the following in particular "air-retaining" surfaces are assumed, although the term does not exclude other gases. The water surface can be any water surface or aqueous substance that can be contaminated with oil or an oily substance, in particular the surface of waterbodies such as seas, lakes, rivers or canals.

The use of air-retaining surfaces for oil removal enables that the oil replaces the air layer and is transported into a vessel via the air-retaining surface. The device essentially comprises a fabric that retains air under water, in particular a textile, and a collection container connected to it. The hydrophobic, preferably superhydrophobic, fabric comprises surface structures which, immersed under water, retain a gas layer, in particular an air layer, stable on the surface, so that the fabric does not get wet despite a contact with water. If the hydrophobic, preferably superhydrophobic, fabric comes into contact with oil or an oily substance, it is adsorbed and replaces the air layer present under water.

The fabric is hydrophobic, preferably superhydrophobic. In the context of the present application, "hydrophobic" is understood to mean that the contact angle between water and the fabric is greater than 90°. If the contact angle is particularly high, the surface is referred to as "superhydrophobic". In the context of the present application, the term "superhydrophobic" surface is understood to mean that the contact angle of the surface with respect to water is greater than 150°. The contact angle can be determined, for example, by means of drop shape analysis (DSA) by use of a contact angle measuring device. The contact angle with respect to water is preferably greater than 100°, more preferably greater than 140°, particularly preferably greater than 150°.

The hydrophobic, preferably superhydrophobic, fabric is preferably oleophilic, in particular at least partially oleophilic. Here, the term "oleophilic" is understood to mean that the fabric has an affinity for oil or oil-containing substances or other non-polar substances and the surface is easily wetted by them. Lipophilic materials are typically characterized by an oil contact angle of 0° or a lower contact angle, for example measured by use of a contact angle goniometer.

The hydrophobic, preferably superhydrophobic, fabric can be completely oleophilic. A coating with fluorocarbon-containing compounds or silicones can, for example, provide a simultaneously hydrophobic and oleophilic surface.

In the context of the present invention, the term "oil" denotes crude oil or mineral oil and oily or oil-containing substances. The oil is only adsorbed on the surface of the fabric. However, the oil is not absorbed. As a result, it can be transported over the fabric and discharged into the container. The fabric can partially rest on the water surface, wherein at least one end is immersed in the water, so that it is in fluid communication with the surface of the water at one end. As a result, capillary forces can be built up via the fabric. The fabric is in contact with the water surface at least at one point so that it can come into contact with the oil and can take it up. Here, a meniscus towards the fabric, as it can arise at the contact point at the water surface, is useful, but not mandatory. The fabric can be partially immersed in water, for example at one end, so that the fabric is in contact with water with the exception of the area of the gas or air layer. The fabric is preferably not completely submerged. In the case of a completely submerged fabric, there would only be a contact with the surface and thus with the oil if the air-retaining fabric would be moved to the oil from below so that it comes into contact with the oil at the oil-water transition area.

A part of the fabric is disposed under the water surface for the transport of the oil and is in fluid communication with the water. The other end of the fabric is disposed within the container. Here, a part of the fabric is disposed within the container below the level of the water surface. This allows the oil to displace the air layer and to flow into the container. Without being bound to any particular theory, it is assumed that the transport occurs via physisorption and/or van der Waals forces.

When the air is displaced and the fabric is wetted with oil, the driving force for the transport of the oil or the oily substance into the container results from the difference in height of the fabric outside on the water surface and inside on the bottom of the container. As long as the end of the hydrophobic, preferably superhydrophobic, fabric disposed in the collection container is below the water surface and/or the oil film, the oil is transported on the surface of the fabric until its entire surface is covered and flows into the collection container. As the oil enters the container, the oil level inside the container rises and its weight increases. This causes the container to sink deeper into the water. As long as the level of the oil inside the container is below the water surface, oil will be collected from the water surface and will flow into the container. As soon as the oil level inside the collection container is the same as the water level, the transport stops.

By means of additional weights and/or floating bodies, the weight of the container can be adjusted so that the container floats, but the bottom of the container is always below the water surface in the unfilled state. Since oil has a lower density than water, the buoyancy can be adjusted by external weights and/or floating bodies so that the container does not sink even in the filled state.

A particular advantage of the described operating principle of the device is that it neither needs pumps actively sucking oil nor consumes material that absorbs the oil and then has to be disposed of. The device provides a passively operating, noiseless solution. No fuel is used to operate an actively working machine, and therefore no additional emissions are generated. No additional environmental impact from the removal of the oil will be produced. This allows the device to be used even in nature reserves. The oil is collected and transferred to a collection container. If necessary, the fabric can even be cleaned and reused. Thus, there is no additional waste besides the collected oil. In particular, the device can also be used prophylactically. The arrangement of the collection vessel and the oil-adsorbing fabric is preferably compact and can be adapted to the surroundings.

The filled container can be emptied, in embodiments in which a lid is provided, for example by opening the lid.

The fabric can be fixed in the interior of the container, for example at the bottom of the container or at the side wall. The fabric is preferably releasably fixed. Then, the fabric is replaceable, or it can be cleaned by physical processes such as washing and/or centrifugation and reused.

According to the invention, the oil-transporting means is formed from a hydrophobic, preferably superhydrophobic, fabric. The fabric is preferably a textile. The fabric can also be a film. It is essential that a surface of the fabric has structures that can retain an air layer on the surface under water. These can be filament-shaped and/or grid-like structures.

A "filament" or "filament-shaped structure" in the context of this application is any elongated structure, regardless of the material, that has the required properties. In the textile sector a distinction is made between protruding hairs, protruding fibers and filaments that are of great length. In the context of this application, the term "filament", however, is used for any type of structure that has ends and, for this application, is synonymous with the terms "fiber" or "hair" used in the textile sector. A filament in the context of this application is also a longer structure that is bound to a surface with two or more points. The area between two contact points then defines the length of the filament in the sense of this application. These can be structures of an order of magnitude in the range from nanometers to millimeters. The filaments have a length that is greater than the diameter. The ratio of diameter to length (diameter:length) for the filaments is preferably between 1:2 and 1:40. Suitable lengths of the filaments are in the range from $\geq 1$ µm to $\leq 6000$ µm, preferably in the range from $\geq 2$ µm to $\leq 3000$ µm. The diameter of filaments can be measured, for example, by means of scanning electron microscopy. If the fibers have different diameters along their length, the diameter in the middle of the filaments (50% of the length) is taken as a basis. Per mm$^2$ surface area preferably from $\geq 1$ to $\leq 1 \times 10^6$ filaments are bound. The density of the filaments is preferably in the range from $\geq 5$ to $\leq 5000$, preferably in the range $\geq 20$ to $\leq 1000$ filaments per mm$^2$ surface area.

The elasticity, determined as the modulus of elasticity, of the filaments is preferably in the range from $\geq 10^4$ N/m$^2$ to $\leq 10^{12}$ N/m$^2$, preferably in the range from $\geq 10^4$ N/m$^2$ to $\leq 10^{10}$ N/m$^2$. The elasticity allows the filaments to be deflected. The elasticity makes it possible to keep the gas or air layer on the surface even in the case of currents and pressure changes. In particular, the surface of the filaments is hydrophobic, preferably superhydrophobic, preferably at least partially or completely lipophilic. The filaments are able to retain an air layer under water on the surface of the fabric permanently or at least for the duration of the application. This can be displaced by the oil, thereby providing a use for its adsorption from a water surface.

The shape of the filament-shaped structures or filaments can be arbitrary. For example, the filaments can have tapered, rounded or flattened ends. In particular, the filaments can be structurally and/or chemically anisotropic. Preferably, the filaments can be structurally anisotropic, i.e. there are areas in which the filaments are cut, in particular in which they form undercuts, preferably closed undercuts. Such structurally anisotropic structures can be similar to e.g. *Salvinia molesta*. Here, by means of a rigid stem of any length, the deformation can only take place in the area on the stem which comprises closed undercuts, so-called "cups". The deformation can be measured as described above. A higher volume of the gas layer, in particular a very high volume of air, can advantageously be provided by rigid long stems. The increase in the gas volume means an increase in the adsorbing capacity for oil.

The filaments can also comprise areas that are chemically anisotropic, in particular in which the surface properties result in that parts of the filaments are amphiphobic, in particular hydrophobic, while others are amphiphilic, in particular hydrophilic. Amphiphilic means that the contact angle between the surface and the liquid in these areas is <90°, hydrophilic means that the contact angle with respect to water is <90°. Preferably the tip of the filaments, i.e. the area of the filaments in contact with the water, is hydrophilic. As a result, the tips do not lose contact with the water even in the case of pressure fluctuations. In a particularly preferred embodiment, the filaments comprise both chemically anisotropic areas and structurally anisotropic areas.

In preferred embodiments, a large number of filaments are arranged on the surface of the fabric. Usable fabrics with a large number of filaments are commercially available. The fabric is preferably a flock textile. The term "flock textile" means that a large number of fibers are applied, for example in an electrical field, onto a substrate coated with an adhesive. By means of the field the fibers can be aligned vertically. Methods of mechanical and electrostatic flocking are known and widely used. Fibers or yarns form the starting basis for flock fibers. Chemical fibers are preferred, in particular viscose, polyacrylonitrile, polyamide and polyester fibers. Particularly preferred polyacrylonitrile, polyester or polyamide fibers can be used. Basically all materials to which an adhesive adheres, especially textiles, can be flocked. The textile can be formed from a knitted fabric, a knotted fabric, a woven fabric, a non-woven fabric or a scrim. The textile can for example be formed from a knitted or knotted fabric made of polyester, polyamide or polypropylene.

Commercially available flocks are preferably made hydrophobic in order to increase the hydrophobicity of the fabric, in particular by means of a superhydrophobic coating. A superhydrophobic coating can be obtained, for example, by coating with siloxanes or silicones or the chemical attachment of perfluorinated molecules, e.g. polytetrafluoroethylene (PTFE). Among the commercially available products the products sold by Evonik GmbH under the trade name Tegotop®, for example Tegotop® 105 or Tegotop® 210, and PTFE-based products under the trade name "Teflon" from DuPont Co are preferred.

The fabric is preferably a textile fabric. In preferred embodiments, the fabric is designed as a spacer textile. In the present case, a "spacer textile" is understood to mean spacer textiles, in particular knitted spacer fabrics, comprising two outer layers spaced apart from one another and comprising spacer threads connecting the outer layers to each other. Spacer textiles with spaced-apart upper and lower cover layers as well as spacer threads extending therebetween are characterized by good, uniform pressure-elastic properties with an overall light structure. This supports the development of a stable air layer. Spacer textiles can be designed as a knitted fabric, knotted fabric or woven fabric. The spacer threads are interlaced in the upper and lower cover layer. The spacer threads thus correspond to the filament-like structures of the fabric. Technical polyamide yarns, polyester or polyethylene, for example, can be used as thread material for the spacer threads. The thread material can be a polyfilament yarn. This can be made of polyester and, for example, have a filament diameter of up to 0.5 mm, preferably 0.2 mm. Preferably, monofilaments can be used as spacer threads, for example made of polyamide, polyester, polypropylene or polyethylene. These have a high flexural rigidity and are characterized by a high elasticity.

The hydrophobic, preferably superhydrophobic, fabric can comprise filament-shaped structures, which are connected to a surface and wherein the fabric is designed for example as a flock. Such "single hair surfaces" as with *Salvinia* are generally preferred. Or the filament-shaped structures form spacer threads which connect two spaced-apart layers of the fabric to each other, and the fabric is designed as a 3D spacer textile.

In further embodiments, the hydrophobic, preferably superhydrophobic, fabric can comprise grid-like structures which are designed in such a way that they retain a gas layer on the surface under water. In the context of the present invention, the term "grid-like structures" describes perforated structures, in particular also net-like structures, and in particular does not refer to the strength of the structures. The grid-like structure is spaced apart from the base of the fabric by means of spacers, wherein the distance to the base is in the range from ≥0.1 µm to ≤10 mm, and the grid-like structure comprises openings of an average diameter in the range from ≥0.5 µm to ≤8 mm. Such grid-like structures can form an air layer under water.

Grid-like structures can be formed by intersecting fibers or filaments, as well as by perforated plate-shaped surfaces. Grid-like structures of intersecting fibers or filaments can be formed from a flexible material such as metal, textile fiber, plastic, or resin, e.g. epoxy resins. The shape of the openings is variable and can be round, oval or angular, regular or irregular, as long as the structure, regardless of the shape and the geometric design, allows by means of the net or grid-like design a stable air layer to be formed underneath. Here, the thickness of the air layer is determined by the distance between the grid-like structure and the surface of the fabric. This can be in the range from ≥1 µm to ≤6 mm, preferably in the range from ≥10 µm to ≤2 mm. The distance between the grid-like structure and the surface of the fabric can be determined by spacers, wherein the spacers can be formed by individual filament-shaped, rod-shaped structures, or by a contiguous porous structure, or by a combination thereof. The hydrophobic, preferably superhydrophobic, fabric with grid-like structures can be designed in a form that corresponds to a 3D spacer textile with a grid-like layer.

The shape of the hydrophobic fabric can vary. Both, single strips as well as continuous adsorber surfaces, especially textiles, can be used. In embodiments, the fabric is designed in the form of a plurality of strip-shaped surfaces. In further embodiments, the fabric is designed in the form of a continuous surface which is arranged around the container. The fabric can also be designed in the form of a combination of strip-shaped surfaces and larger continuous surfaces.

The shape of the container is arbitrary. The container can, for example, be cylindrical or spherical or may have the shape of a cube, a cuboid or a cone. The dimensions of the container are flexible, too. Small constructions like laboratory vials with a height and diameter of a few centimeters can be used, as well as large collection containers, which can have the size of a barrel or a bin, for example. With regard to the container, it is essential that a part of the fabric is disposed in the container below the level of the water surface, because only as long as the end of the hydrophobic, preferably superhydrophobic surface disposed in the collection container is below the water surface or the oil film, the oil can flow into the container.

In embodiments, the device can be designed as a floating device. In other embodiments, the container can be completely disposed under water.

In embodiments of the device it can accordingly be provided that the container floats in the water or is locked on the water surface, wherein the bottom of the container is disposed below the water surface in the unfilled state. Such an embodiment is also referred to hereinafter as an "oil float".

In embodiments, the fabric can be guided into the container via the side wall of the container or through slot-shaped openings in the side wall. Since the oil film on the fabric is thin, it can be transported via the surface into the container even if the fabric is guided into the container via the side wall of the container above the water level. Here, the edge of the container can protrude up to 10 cm or even up to 20 cm above the water surface. The fabric can also be guided into the interior of the container through narrow, slot-shaped openings in the side wall of the container. The opening can be disposed either above or below the water surface. The opening is preferably sufficiently wide in order to enable the oil to be transported over the surface. Preferably the height of the opening is small in order to prevent water from entering. This is supported by the fact that the fabric is hydrophobic and therefore water-repellent both in the oil-unwetted, air-retaining state and in the oil-wetted state.

In embodiments, the container is provided with a lid. This has the advantage that splash water or rainwater cannot enter into the container. The lid can be attached to the outside of the container with spacers. Here, the spacers can be guided through a previously attached fabric and thus penetrate it. In other embodiments, the lid can be attached to the container by means of an internal, preferably central, screw. Preferably. the lid comprises a valve for pressure compensation. Preferably, an valve air-permeable to the outside is attached to the top side.

The container can be emptied or the oil can be removed, for example, by pumping out the container. Alternatively, the oil can be removed from the container by simply pouring it out. Here, embodiments are advantageous in which the oil first flows from the fabric onto an edge region, which can optionally comprise a drainage channel, and from there into the collection container. Alternatively, the device can be completely removed from the water. Small containers can be equipped with a valve on the bottom so that the device can be temporary lifted out of the water and the oil can be drained through the valve. Moreover, an exchangeable inner container can be provided.

In further embodiments of the device it can be provided that the container is a closed container, wherein the closed container comprises a device for pressure compensation. A closed container can be brought under the water surface. Such an embodiment is also referred to hereinafter as an "oil diver". The mode of operation corresponds to that of the floating device. If the collection container is completely under water, this has the advantage that it is permanently guaranteed that the ends of the fabric are disposed below the water surface. A device for pressure compensation within the closed collection container is necessary, because this is initially filled with air and without the possibility of venting no oil can pass into the closed container. The device can comprise a level indicator which can be provided with a plug.

The driving force for the oil transport results from the difference in height between the point at which the oil is taken up, which usually corresponds to the water surface, and the point at which it is discharged again. In this embodiment, this can be a hollow sphere. Advantages are that this difference can be made larger in the embodiments of the oil diver than in the embodiments of the oil float. This allows a faster transport with the same materials. In addition, the transport is directed exclusively downwards, in contrast to the oil float, in which the oil at the beginning with unwetted textile must take place against the force of gravity. The hollow sphere can comprise a plurality of openings through which the oil is transported into the interior. In this way, a further increase in efficiency can be achieved.

Another aspect of the invention relates to a method for taking up oil from a water surface by means of a container for receiving the oil and an oil-transporting means, wherein a portion of the oil-transporting means is brought into fluid communication with the water surface and a further portion of the oil-transporting means is disposed within the container, wherein the oil-transporting means is formed from a hydrophobic, preferably superhydrophobic, fabric the surface of which has filament-shaped and/or grid-like structures, which are designed such that they retain a gas layer on the surface under water, wherein the oil is transported into the container via the hydrophobic, preferably superhydrophobic, fabric.

For the description of the container for receiving the oil and the oil-transporting means, reference is made to the above statements on the device. If the device is placed in water, on or below a water surface, and if a part of the fabric is below the water surface, so that one end is in fluid communication with the water surface, and if the part of the fabric which is disposed within the container is below the level of the water surface, the oil can displace the air layer and flow into the container.

In embodiments of the "oil float", in which the container floats in the water or is locked on the water surface, wherein the bottom of the container in the unfilled state is below the water surface, this can be achieved by using weights at the container and/or at free ends of the fabric. In embodiments of a closed container that is placed under the water surface, this can also be held under the surface by anchoring at the bottom of the water body. Such an "oil diver" can be disposed 30 cm below the surface, for example. Up to a depth of 30 cm, an air layer retained on the surface of the fabric can be replaced by oil and the oil can flow into the container.

Another aspect of the invention relates to the use of a device comprising a container for receiving the oil and an oil-transporting means, wherein a portion of the oil-transporting means can be brought in fluid communication with the water surface and a further portion of the oil-transporting means is disposed within the container, wherein the oil can be transported into the container via the oil-transporting means, wherein the oil-transporting means is formed from a hydrophobic, preferably superhydrophobic, fabric the surface of which comprises filament-shaped and/or grid-like structures, which are designed such that they retain a gas layer on the surface under water for taking up oil from a water surface. For the description of the device, reference is made to the above statements on the device.

Examples and figures which serve to illustrate the present invention are given below.

Figure 1:
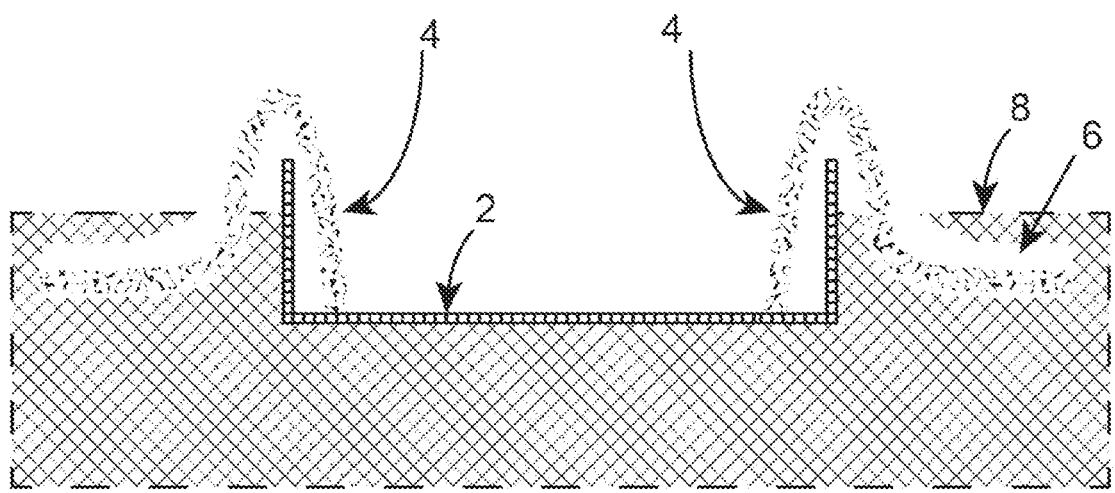
FIG. 1 is a schematic representation of a principle for taking up oil from a water surface by means of a device according to a first embodiment of the invention in FIGS. 1A, 1B, 1C and 1D.
Figure 1:
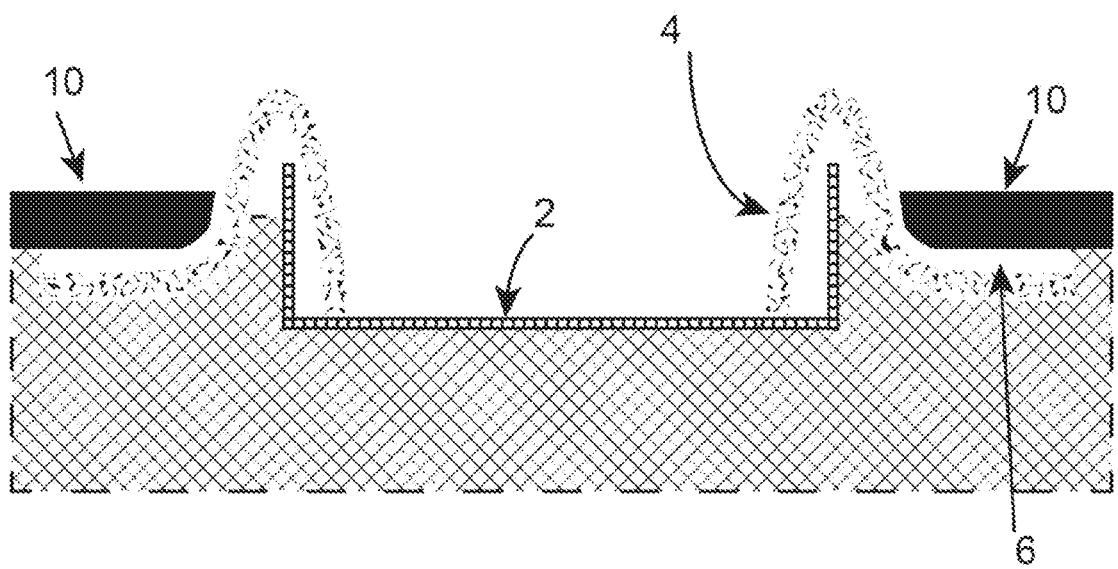
Figure 1:
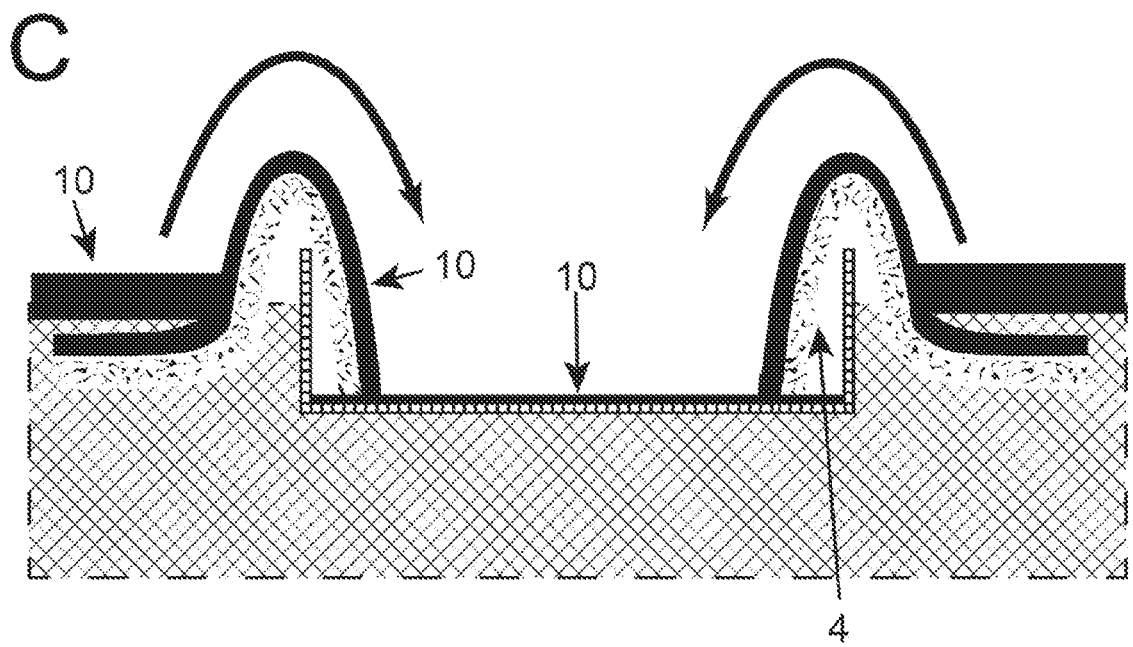
Figure 1:
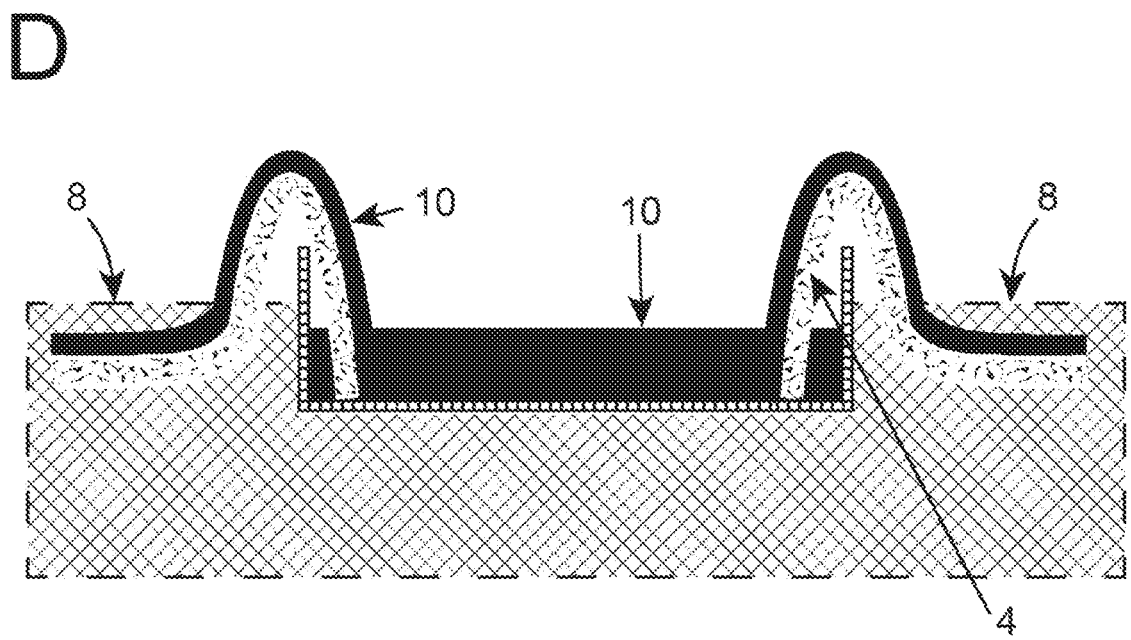

FIG. 1 shows in FIGS. 1A, 1B, 1C and 1D a schematic representation of a principle for taking up oil 10 from a water surface 8 by means of a floating device. FIG. 1A shows a floating device for taking up oil 10 from a water surface 8. The device comprises a container 2 for receiving the oil and an oil-transporting means designed as a superhydrophobic fabric 4. The container 2 floats on the water, wherein the bottom of the container 2 is disposed deeper in the water than the superhydrophobic fabric 4. The edge of the collection container 2 protrudes above the water surface 8. One end of the fabric 4 is fixed at the bottom of the container 2, as a result of which a part of the fabric 4 which is disposed within the container 2 is below the level of the water surface 8. The fabric 4 is laid over the edge of the container 2. The surface floats on the water surface 8, wherein the end facing away from the container 2 is held under the water surface 8, for example by a small weight. A part of the fabric 4 is thus located below the water surface 8 and is in fluid communication with the water. The superhydrophobic fabric 4 comprises filament-shaped structures on the surface which are designed in such a way that they retain an air layer 6 on the surface under water.

FIG. 1B shows a further representation of the device shown in FIG. 1A. An oil film 10 has spread over the water surface 8. In FIG. 1C the oil 10 on the water surface 8 comes into contact with the fabric 4. The oil 10 is adsorbed by the filament-shaped structures of the fabric 4. Thus, the air layer 6 is replaced by the oil 10. The fabric 4, for example a flock textile, is preferably not only superhydrophobic but also oleophilic. To be wetted with water under water means an energetically very unfavorable state, therefore air is drawn under water and retained as an air layer 6 on the surface. In terms of energy, this is also a very unfavorable state, since the air has to be retained against the buoyancy, but it is more favorable than if the superhydrophobic, oleophilic fabric 4 were wetted with water. If the oil 10 comes into contact with the fabric 4, the oleophilic surface is wetted with oil 10. An energetically more favorable state is achieved when the air layer 6 is replaced and the textile fabric 4 is wetted with oil 10 and the air retained on the surface can rise. The oil 10 is transported downwards and the energy stored by the energetically unfavorable process of retaining the air is set free hereby. A transport also takes place on the water surface, wherein the oil 10 can flow into the container 2. The oil 10 is thereby transported in the filament-shaped structures of the fabric 4 along the surface into the container 2. If the edge of the container 2 does not protrude too much above the water surface 8, the oil 10 can flow over the edge into the container 2. As long as the end of the superhydrophobic fabric 4, which is located within the collection container 2, is below the water surface 8 and/or the oil film 10, the oil 10 is discharged again. If the end in the collection container 2 is above the water surface 8 and/or the oil film 10, the transport stops at the point in time at which the flock is completely wetted.

As a result of the entry of the oil 10 into the container 2, the oil level rises in the interior of the container 2 and its weight increases. As a result, the container 2 sinks deeper into the water. As long as the level of the oil 10 inside the container 2 is below the water surface 8, oil 10 is collected from the water surface 8 and will flow into the container 2. In FIG. 1D there is no longer any oil 10 on the water surface 8.

Figure 2:
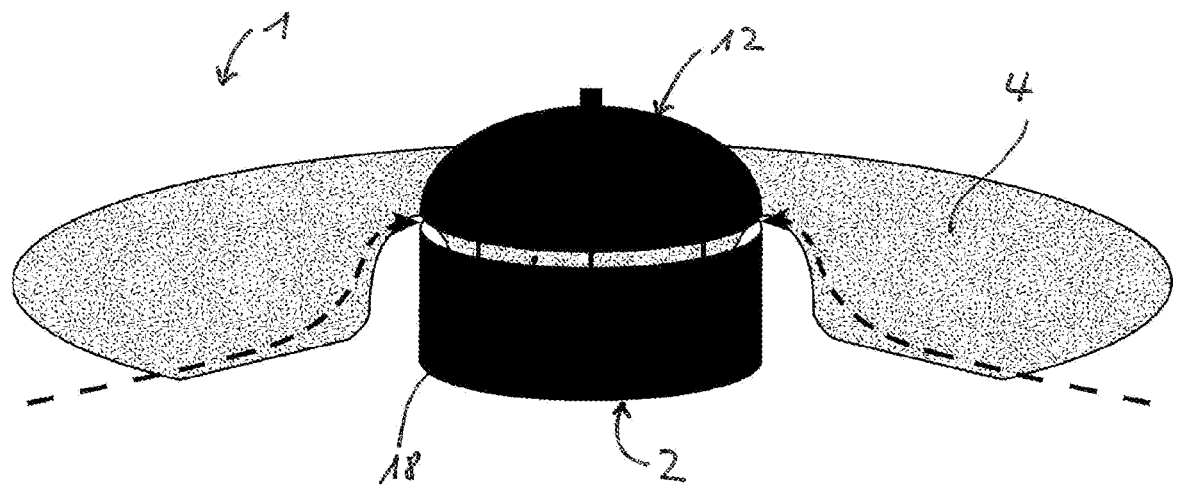
FIG. 2 is a schematic representation of a device for taking up oil from a water surface according to a first embodiment of the invention.

FIG. 2 shows schematically an embodiment of a device 1 for taking up oil 10 from a water surface 8 which is designed as a floating device 1, a so-called "oil float". The device 1 comprises a container 2 for receiving the oil and an oil-transporting means formed by a superhydrophobic fabric 4. This comprises filament-shaped structures on the surface, which are formed such that they retain a layer 6 of gas on the surface under water. The fabric 4 has the form of a continuous surface which is arranged around the container 2. The fabric 4 is guided into the container 2 through slot-shaped openings 18 in the side wall. The container 2 is provided with a lid 12.

Figure 3:
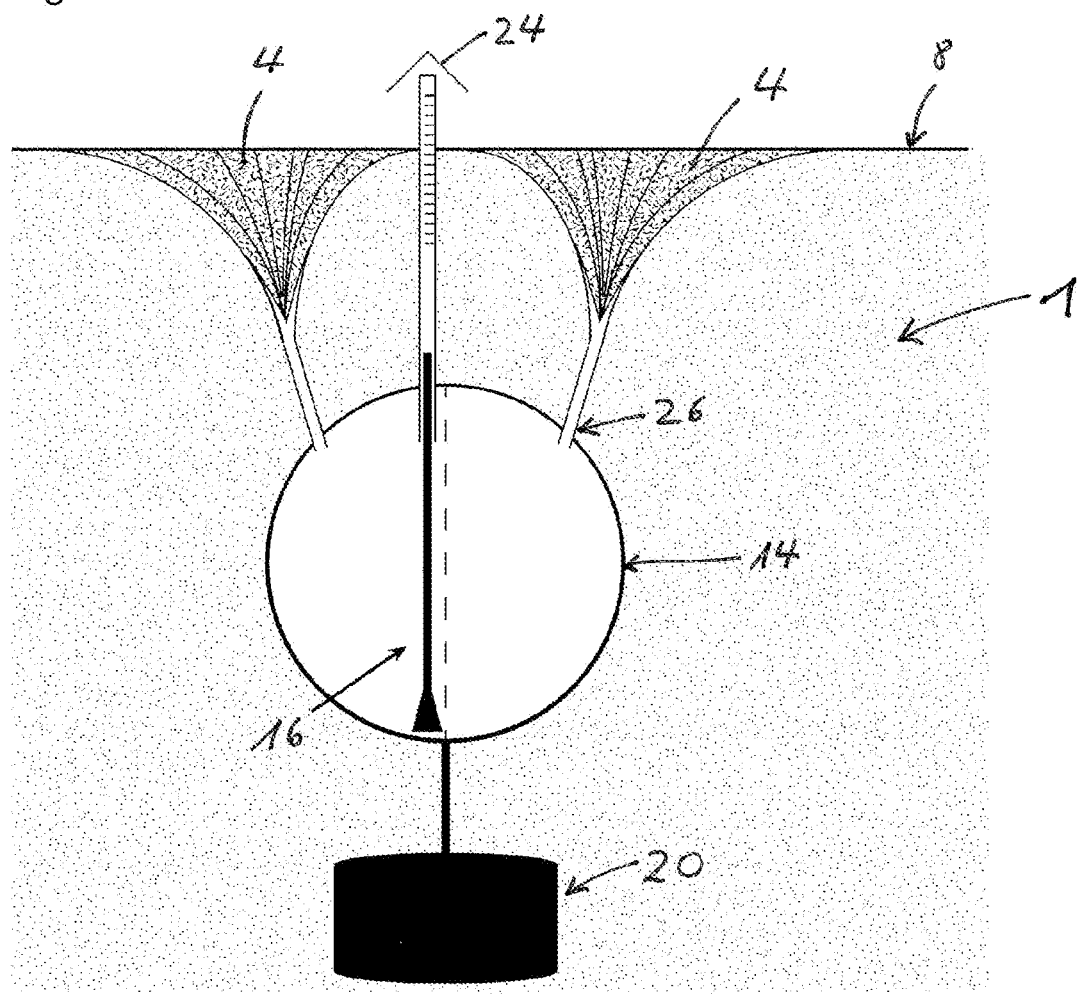
FIG. 3 is a schematic representation of a device for taking up oil from a water surface according to a second embodiment of the invention.

FIG. 3 shows schematically an embodiment of a device 1 for taking up oil 10 from a water surface 8, which is designed as a diving device, a so-called "oil diver". The container for receiving the oil 10 is a closed container 14 in the form of a hollow sphere. This is held under the water surface 8 by means of an anchorage 20. The closed container 14 comprises two inlet openings 26 through which the superhydrophobic fabric 4 is introduced into the closed container 14. The driving force for the oil transport results from the height difference between the water surface 8, at which the oil 10 is taken up, and the lower-lying container 14, into which the oil 10 is transported. In the diving embodiment the transport is directed exclusively downwards. The device 1 comprises a means for venting and for pressure compensation 16 within the container 14. The means for venting and for pressure compensation is protected against rain and splash water by a lid 24.

EXAMPLE 1

Taking Up Oil by Means of a Floating Device

In order to prepare a device for taking up oil, a laboratory glass container with a height of 5 cm, a diameter of 2 cm (wide-mouth vial with rolled edge for snap-on caps, 45×22 mm, Scherf Präzision Europa GmbH) was fixed on a Petri dish with washers as anchoring, whereby a pedestal and sufficient weight were ensured. A flock textile with a fiber length of 1.2 mm and a density of 13 fibers per $mm^2$ (SwissFlock AG) was cut to strips with a length of 15 cm and a width of 1 cm. The surface of the flock textile was hydrophobized with Tegotop 210 (Evonik Industries). One end of the flock textile strip was glued to the inside of the glass container so that the end rested on the bottom of the container.

The device was placed in an aquarium. The aquarium was filled with water, wherein the edge of the collection container protruded approximately 5 mm above the water surface. The flock textile floated on the water surface. The end resting on the water was held under the water surface by a small weight and retained an air layer. Due to the superhydrophobic property of the flock textile, a meniscus formed between the water surface and the textile.

Subsequently 10 ml of an oil (isopropyl myristate, Sigma Aldrich) which was colored with Sudan black (Sigma Aldrich) was placed on the water surface. While spreading over the water surface it finally reached the flock textile. Due to the oleophilic property of the textile and supported by the meniscus of the water, the oil was adsorbed on the surface of the flock textile. It only took a few seconds for the oil to displace the air layer under water. The transport into the glass vessel lasted a little longer. However, as soon as the flock textile was completely wetted, oil was separated out again within the glass vessel.

EXAMPLE 2

Taking Up Oil by Means of a Diving Device

For the oil diver, a plastic Petri dish was glued onto a plastic hemisphere with epoxy resin so that a closed volume was created. The joints were additionally sealed with hot glue (UHU). Weights were attached to the underside of the sphere in order to be able to keep the air-filled volume under water. Two holes were drilled in the top side formed by the Petri dish. Two cut strips of a flock textile (fiber length 1.2 mm, density 13 fibers per $mm^2$, SwissFlock AG) with a length of 12 cm and a width of 1 cm were hydrophobicized with Tegotop 210 (Evonik Industries). The two strips were placed one on top of the other at the fiber side and fixed at one end by means of a shrink tubing. This end was passed through one of the holes into the inside of the oil diver. The sealing was carried out again with hot glue. A PVC hose with a diameter of 4 mm was inserted into the remaining opening of the oil diver, via which a pressure compensation between the internal volume of the diver and the environment can be established. The whole device was placed in an aquarium filled with water. The diver was disposed below the water surface. The two loose ends of the two flock textiles laid against the water surface. The PVC hose protruded from the surface of the water. The sealings withstood the water and the inside of the diver remained dry.

Then 10 ml of an oil (isopropyl myristate, Sigma Aldrich) which was colored with Sudan black (Sigma Aldrich) were placed on the water surface. This was adsorbed onto the surface of the flock textile and covered it completely after just a few seconds. Moreover a transport to the oil diver took place. The oil dripped down from the fixed ends, which were fixed within the volume to its lid. It was found that approximately to the same extent also water got into the interior of the oil diver via the flock textile. It is assumed that the reason for this was that the gap between the flock textiles pressed together was too large. It is accordingly assumed that an improved fixation by pressure, for example by a clamp, should provide a remedy. All in all, the principle of collecting oil underwater with a diving device could be demonstrated.

LIST OF REFERENCE SYMBOLS device 1
container 2
superhydrophobic fabric 4
gas layer 6
water surface 8
oil 10
lid 12
closed container 14
pressure compensation device 16
openings 18
anchorage 20
lid 24
inlet openings 26

The invention claimed is:

1. A device for taking up oil from a water surface, comprising:
   a container is configured to receive the oil and
   a hydrophobic fabric is configured to transport the oil, said fabric having a surface which comprises filament-shaped structures, wherein a first portion of the fabric is in fluid communication with the water surface and a second portion of the fabric is disposed over a sidewall of the container and a first end of the second portion within the container is located below the level of the water surface,
   said first portion of the fabric being located outside of the container and above the first end of the second portion of the fabric located within the container below the level water surface to create a height difference between the first portion of the fabric and the second portion of the fabric which is a driving force for the transport of the oil or an oily substance into the container,
   with the fabric configured to adsorb oil so that the oil is transported into the container via the fabric,
   wherein on the surface of the fabric comprising the filament-shaped structures a plurality of filaments is arranged, wherein said filament-shaped structures are configured to retain a gas layer on the surface of the fabric under water, which gas layer is replaced by oil when the fabric comes into contact with oil or the oily substance, whereby the oil is transported into the container via the fabric and discharged therein as long as the second portion of the fabric within the container is below the water surface and wherein the fabric is designed as a three-dimensional spacer textile, said spacer textile comprises two outer layers spaced apart from one another and spacer threads extending therebetween connecting the outer layers to each other; wherein the spacer threads correspond to the filament-shaped structures.

2. The device according to claim 1, characterized in that the fabric is designed in the form of a plurality of fabrics each in the form of a strip-shape.

3. The device according to claim 1, characterized in that the container floats in the water, wherein the bottom of the container is disposed below the water surface.

4. The device according to claim 1, characterized in that the container comprises a lid.

5. The device according to claim 1, characterized in that the container is a closed container, wherein the closed container comprises a pressure compensation valve.

6. A method for taking up oil from a water surface using a container configured to receive the oil and a hydrophobic fabric configured to transport the oil, comprising
   guiding a first portion of the fabric over a side wall of the container and a first end of the first portion of the fabric is disposed within the container below the level of the water surface, wherein the fabric is designed as a three dimensional spacer textile, which comprises two outer layers spaced apart from one another and spacer threads extending therebetween connecting the outer layers to each other,
   bringing a second portion of the fabric into fluid communication with the water surface, wherein said second portion of the fabric is located outside of the container and above the first end of the first portion of the fabric located within the container below the level water surface to create a height difference between the first portion of the fabric and the second portion of the fabric which is a driving force for the transport of the oil or an oily substance into the container, with the fabric configured to adsorb oil so that the oil is transported into the container via the fabric,
   wherein a surface of the fabric comprises filament-shaped structures which are designed such that said filament-shaped structures are configured to retain a gas layer on the surface of the fabric under water, which gas layer is replaced by oil when the fabric comes into contact with oil or the oily substance, wherein the spacer threads correspond to the filament shaped structures,
   transporting the oil into the container via the fabric and discharging the oil therein.

7. The device according to claim 1, characterized in that the fabric is designed in the form of a continuous surface arranged around the container.

8. The device according to claim 1, characterized in that the container is locked in a fixed position on the water surface, wherein the bottom of the container is disposed below the water surface.

9. The method according to claim 6, wherein the first portion of the fabric is guided into the container through slot-shaped openings in the side wall.

10. The device according to claim 4, wherein the lid comprises a valve for pressure compensation.

11. The device according to claim 1, characterized in that the hydrophobic fabric is a superhydrophobic fabric.

* * * * *